United States Patent

Metzger et al.

[15] 3,662,659

[45] May 16, 1972

[54] CAMERA APPARATUS FOR CONTROLLING DIAPHRAGM AND SHUTTER SPEED

[72] Inventors: Lenard M. Metzger; Richard J. Bresson, both of Rochester, N.Y.; Randall T. McConaughey, Boulder, Colo.

[73] Assignee: Eastman Kodak Company, Rochester, N.Y.

[22] Filed: June 22, 1970

[21] Appl. No.: 48,365

[52] U.S. Cl. .......................... 95/10 CD, 95/10 CT, 95/64 D
[51] Int. Cl. ......................................... G03b 9/07, G03b 7/08
[58] Field of Search ........................................ 95/10 C, 64 D

[56] References Cited

UNITED STATES PATENTS 3,538,823  11/1970  Wagner ............................. 95/10 C
3,427,941  2/1969   Metzger ......................... 95/64 D X
3,292,516  12/1966  Sato et al. ........................ 95/10 C
3,464,332  9/1969   Davison et al. ..................... 95/64 D
3,547,018  12/1970  Haberle .......................... 95/10 C
3,554,104  1/1971   Winkler .......................... 95/10 C

*Primary Examiner*—Samuel S. Matthews
*Assistant Examiner*—Michael L. Gellner
*Attorney*—Robert W. Hampton and William F. Delaney, Jr.

[57] ABSTRACT

An exposure control system for use in photographic apparatus which provides automatic adjustment of the exposure aperture in response to a signal from a photoresponsive member and then actuates a shutter mechanism to make an exposure for an interval determined by a timing circuit as a function of the aperture adjustment and the signal from the photoresponsive member. Preferably, the system includes indicator means controlled by the photoresponsive member to provide an indication of low light conditions and of the termination of the exposure interval.

2 Claims, 2 Drawing Figures

LENARD M. METZGER
RICHARD J. BRESSON
RANDALL T. McCONAUGHEY
INVENTORS

LENARD M. METZGER
RICHARD J. BRESSON
RANDALL T. McCONAUGHEY
INVENTORS

BY *William F. Delaney Jr.*
*Robert W Hampton*
ATTORNEYS

CAMERA APPARATUS FOR CONTROLLING DIAPHRAGM AND SHUTTER SPEED

CROSS-REFERENCE TO RELATED APPLICATIONS

Reference is made to commonly assigned, copending U.S. application, Ser. No. 823,789, filed in the names of Daniel E. Carter et al. on May 12, 1969, and U.S. Pat. application, Ser. No. 823,426, filed in the names of Daniel E. Carter et al. on May 9, 1969.

BACKGROUND OF THE INVENTION

This invention is related to exposure control systems for use in photographic apparatus, such as cameras, and more particularly to an exposure control system in which the exposure aperture and the exposure time are automatically controlled in accordance with the level of scene illumination.

In previous exposure control systems in which an automatic control is provided for determining the length of an exposure interval, provision has been made for the automatic adjustment of the exposure aperture immediately preceding initiation of the exposure interval in accordance with anticipated scene light. Such a system in which the exposure speed is controlled in response to an electronic timing circuit, and the exposure aperture is adjusted to one of a plurality of predetermined discrete aperture sizes by an automatic control system is shown in U.S. Pat. No. 3,464,332, issued to Davidson et al on Sept. 2, 1969. The system disclosed in that patent preselects one of a plurality of predetermined aperture stops by means of a plurality of blades having different aperture sizes to provide a "gross" adjustment according to the level of anticipated scene illumination prior to initiation of the exposure interval. However, such diaphragm control systems provide only discrete aperture stops and do not provide compensation for focus adjustment changes after the aperture has been set but prior to initiation of the exposure interval. Moreover, such systems employ mechanical apparatus requiring considerable space, which is particularly undesirable in view of the recent trend toward miniaturization of cameras.

Another prior art exposure control system including means for automatically adjusting the exposure aperture and shutter speed is shown in British Pat. No. 1,093,235, published on Nov. 29, 1967. The system disclosed in that patent includes a diaphragm control member that is releasable by the shutter actuation lever for rotation under the influence of a spring bias until an electronic trigger circuit actuates a solenoid to stop the member at a position in which the exposure aperture is a size suitable for the level of scene illumination. The mechanical apparatus employed in this system requires numerous moving parts which adds to its assembly costs and space requirements. For example, this diaphragm mechanism includes apparatus for resetting the control member after each exposure. Accordingly, such an exposure control system is not particularly well suited for miniaturized cameras.

Also known in the prior art are electronic shutter timing systems which include indicator means for providing a signal indicating low scene light, so that an operator knows when to use an artificial light source or to ensure camera steadiness for long exposures. In addition, electronic shutter timing systems are known which include means for indicating when the shutter is open, so that an operator avoids moving the camera during a long exposure, and particularly to avoid a mistaken assumption by an operator that the exposure has terminated.

SUMMARY OF THE INVENTION

It is an object of this invention to provide an improved automatic exposure control system requiring few mechanical parts, which automatically adjusts an exposure aperture prior to initiation of an exposure interval, and then controls the length of the exposure interval by means of a time-delay circuit in accordance with the level of scene illumination.

It is another object of this invention to provide an improved indicator system incorporated in such an exposure control system for providing a low light signal when the scene illumination is below a predetermined level, and for providing a "shutter-closed" signal immediately upon termination of an exposure interval.

It is a further object of this invention to provide such an improved indicator system including a single signal means which is actuated prior to an exposure interval when low light conditions exist, and which also is activated in synchronization with the termination of the exposure interval to indicate when the shutter has closed.

An exposure control apparatus according to the preferred embodiment of the present invention comprises a photoresponsive member for providing an electrical output signal related to the level of illumination incident thereon from an object scene, a diaphragm member associated with a magnetic member for movement to any position along a path to vary the size of an exposure aperture, a diaphragm control circuit including a drive coil having oppositely poled inputs for moving the magnetic member for adjusting the diaphragm member in response to the output signal of the photoresponsive means, shutter means actuatable to initiate an exposure interval after adjustment of the diaphragm member and a time-delay circuit for establishing the length of the exposure interval as a function of the diaphragm adjustment and the output signal from the photoresponsive means.

Preferably, an exposure control apparatus according to this invention includes indicator means associated with the photoresponsive member for providing a signal when the level of scene illumination is below a predetermined value, and for providing a signal upon termination of an exposure interval. The indicator means according to the preferred embodiment of the invention is associated with the time-delay circuit and an indicator-control trigger circuit that is activated when the signal from the photoresponsive member is below a predetermined value, in such a manner that the indicator is activated prior to an exposure interval when the level of scene illumination is below a predetermined level, and upon termination of the exposure interval to indicate when the shutter has closed.

The diaphragm control system according to the preferred embodiment of this invention is adapted to move the diaphragm member to any position along a path to vary the size of the exposure aperture by means of drive coil means activated by the diaphragm control circuit which selectively energizes the coil means in response to the level of scene illumination. Preferably, the diaphragm control circuit comprises a differential amplifier. This arrangement provides an analog adjustment of the diaphragm with a few moving parts, and it permits adjustment of the diaphragm to compensate for focusing adjustments made after the exposure control system has been activated, but prior to initiation of the exposure interval in cameras of the type in which the photocell receives light transmitted through the camera objective.

An exposure control apparatus according to the present invention is adapted for exposures in artificial light, as well as in ambient scene light. For photographic exposures made in artificial light, such as with a flashbulb, the exposure aperture can be adjusted according to the focus setting, or it can be adapted for automatic adjustment to a predetermined aperture setting. Preferably, insertion of a flashbulb into a camera socket automatically disables the diaphragm control circuit and mechanically couples the diaphragm means with a focus adjusting means on the camera, since light from an artificial source is a function of the intensity of the source as well as the distance between the object scene and the light source which is usually at the camera.

BRIEF DESCRIPTION OF THE DRAWINGS

The detailed operation of the preferred embodiment of this invention can be described more completely with reference to the accompanying drawings in which.

DETAILED DESCRIPTION OF THE INVENTION

An exposure control system according to the present invention includes an adjustable diaphragm mechanism including a member movable to any position along a path for varying an exposure aperture in accordance with the level of scene light, and a shutter mechanism controlled by an electronic time-delay circuit that establishes the length of an exposure interval. The time-delay circuit preferably is of the integrating type for continuously measuring the total accumulated amount of light energy impinging on a photoresponsive member in the timing circuit. After the diaphragm mechanism has been actuated to adjust the exposure aperture in accordance with the level of scene illumination, the shutter mechanism is then actuated to initiate an exposure interval under the control of the electronic timing circuit that terminates the exposure interval in accordance with the exposure aperture adjustment and in accordance with the amount of illumination actually received during the exposure interval by the photoresponsive member in the timing circuit. The shutter timing circuit can compensate for the exposure aperture setting, for example, by adjustment of an electrical parameter of the timing circuit to vary its time constant, or preferably by varying the aperture of the photoresponsive member used in the timing circuit in accordance with the adjustment of the exposure aperture by the diaphragm mechanism.

Figure 1:
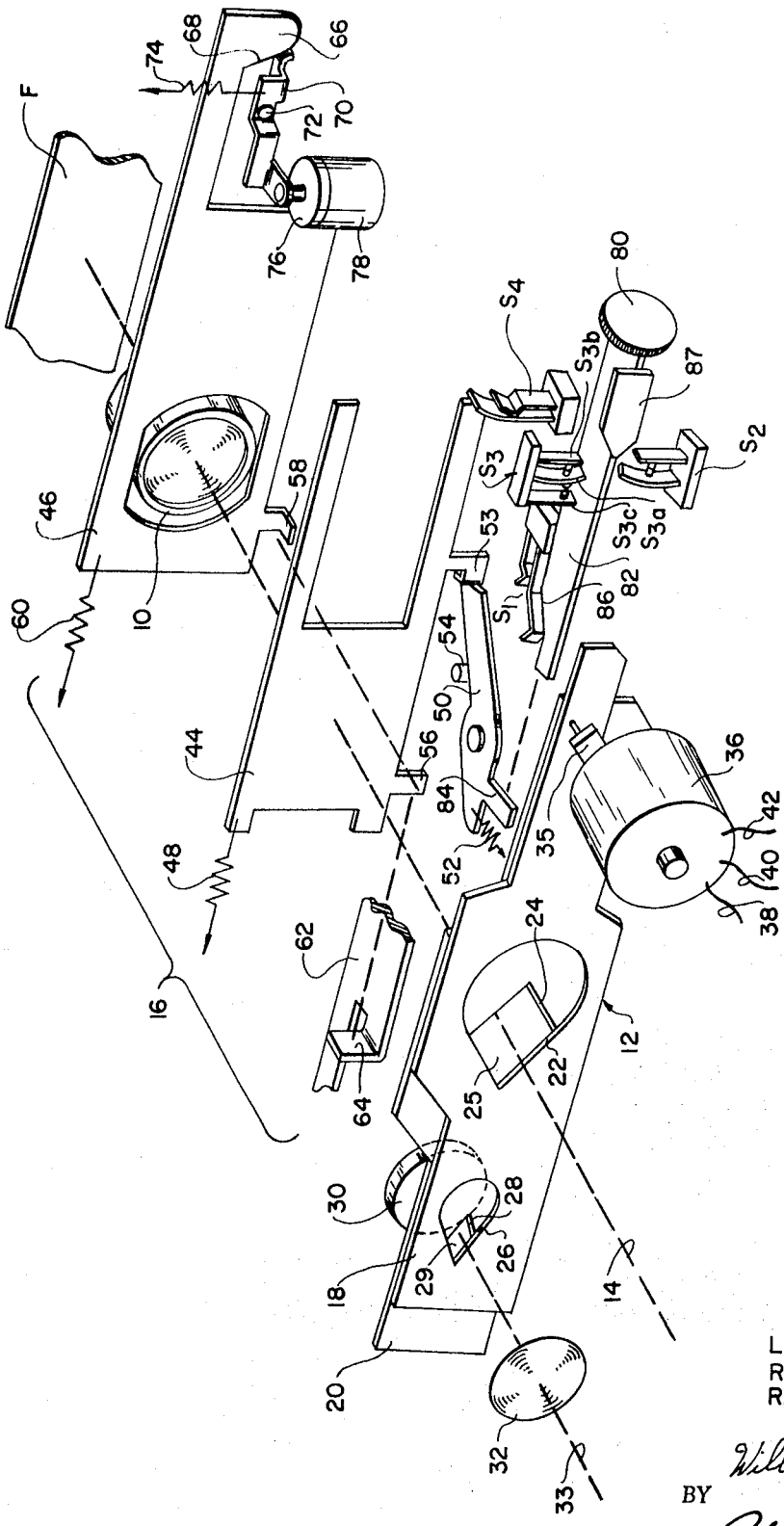
FIG. 1 shows an exploded perspective view of the preferred embodiment of the shutter and diaphragm mechanisms of an exposure control apparatus according to the invention.

Referring now to the accompanying drawings, FIG. 1 shows an exposure control apparatus according to a preferred embodiment of the invention, including an objective 10 for forming an image on photographic film F, a two-bladed diaphragm mechanism 12 for establishing a variable exposure aperture in alignment with the optical axis 14 of the objective, and a two-bladed shutter mechanism 16 for initiating and terminating an exposure through the objective.

Figure 2:
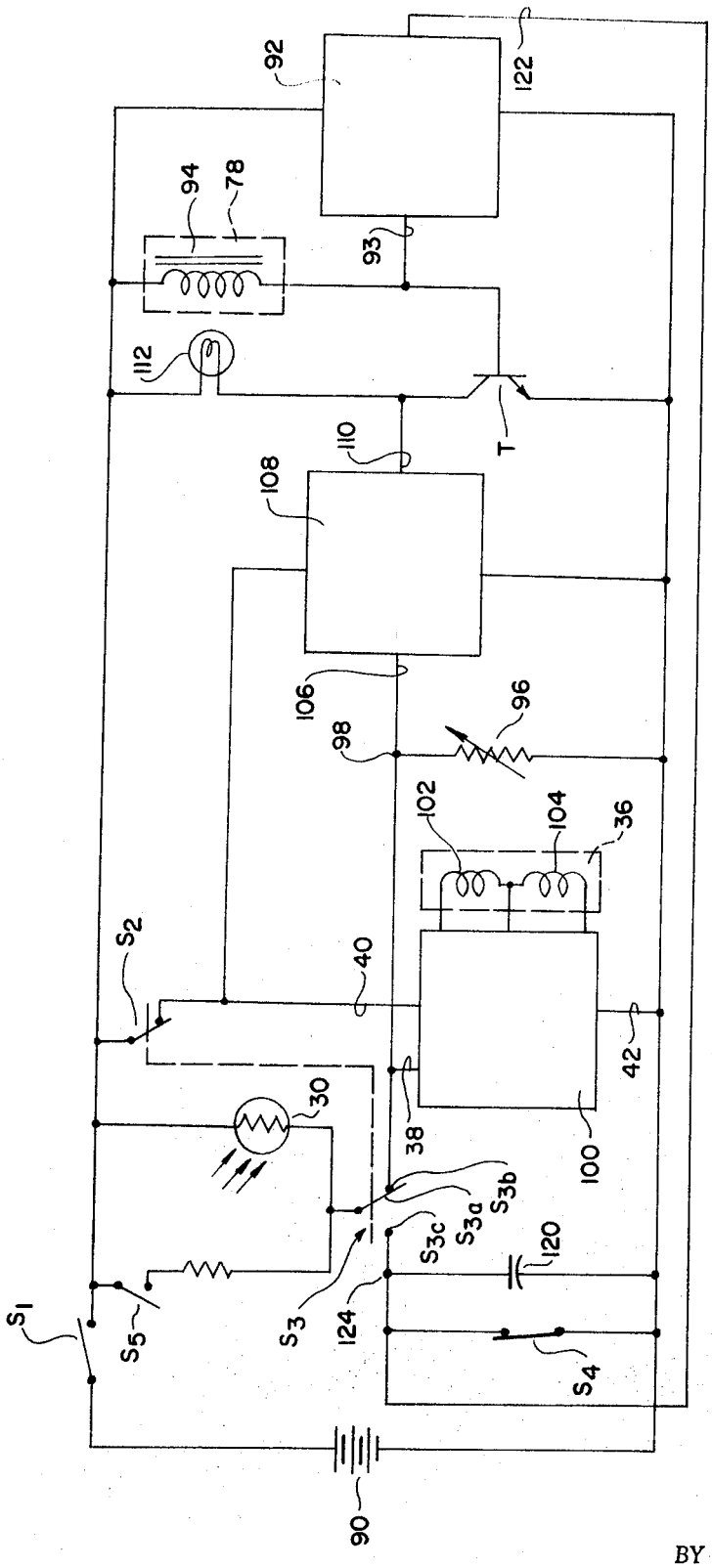
FIG. 2 shows a circuit diagram for controlling the mechanisms shown in FIG. 1, including a time-delay circuit for controlling the exposure time, a diaphragm control circuit and an indicator-control trigger circuit according to the preferred embodiment of the invention.

The diaphragm mechanism 12 includes a pair of blades 18 and 20 that are slidably mounted upon suitable support means (not shown) for equal and opposite movement relative to the lens axis 14. Each of these blades has a tapered aperture 22 and 24, respectively, overlying each other to define an exposure aperture 25 aligned with the optical axis 14. The apertures 22 and 24 are disposed with their tapered portions extending in opposite directions with respect to each other along the line of travel of the two diaphragm blades, such that opposite movement of the blades 18 and 20 will enlarge or diminish the size of the exposure aperture 25. Each of the blades 18 and 20 also has a second tapered aperture 26 and 28, respectively, similar to the tapered aperture 22 and 24, overlying each other to define a second variable aperture 29 overlying a photocell 30. A lens 32 having an optical axis 33 is positioned to form an image of an object scene on the photocell 30 through the variable photocell aperture 29. Thus, opposite movement of the diaphragm blades 18 and 20 will result in a variation of the size of the aperture 29 over the photocell 30 simultaneously with the variation of the size of the exposure aperture 25. The diaphragm blades 18 and 20 are each connected to opposite ends of an armature 35 rotatably driven by an electro-mechanical transducer 36, which in this embodiment is a servomotor having input leads 38, 40 and 42. The operation of this servomotor will be described in further detail with respect to the circuit in FIG. 2 below.

The shutter mechanism 16 is a conventional two-blade system, which is shown in FIG. 1 in its "cocked" position preparatory to actuation to effect an exposure. The shutter mechanism includes a pair of shutter blades 44 and 46 which are slidably mounted upon suitable support means (not shown) for movement relative to the exposure aperture 25.

When the blade 44, which is the "opening" blade in this embodiment, is in its cocked position shown, it is retained against the bias of a spring 48 by a latch member 50 which is biased by a spring 52 into latching engagement with a detent 53, in which position the latch member engages a pin 54. The "opening" blade 44 has a second detent 56 positioned to engage a detent 58 on the blade 46, which in this embodiment is the "closing" blade. Thus, blade 46 is retained in its cocked position against the bias of a spring 60 by the interengagement of the detents 56 and 58. In their respective cocked positions the "opening" blade 44 is retained in a covering relationship with respect to the exposure aperture 25, and the "closing" blade 46 is retained in an uncovering position with respect to the exposure aperture. When the blades are in their respective cocked positions, the spring 48 urges the "opening" blade 44 to an uncovering position with respect to the exposure aperture, and the spring 60 urges the "closing" blade 46 to a covering position over the exposure aperture.

The "closing" blade 46 also includes a second detent 66 having a cam surface 68 adapted to engage a retaining lever 70 pivotally mounted on a pin 72 and biased by spring 74 in a counterclockwise direction into engagement with the detent 66. The opposite end of lever 70 is connected to an electromagnetic keeper 76 positioned adjacent a pole of an electromagnet 78 when the shutter blade 46 is in its cocked position. The electromagnet 78 is energized and de-energized by an electronic timing circuit discussed in more detail below with respect to FIG. 2. When the electromagnet is energized it holds the lever 70 in its retaining position shown in FIG. 1, to hold the blade 46 in its uncovering position when the detents 56 and 58 become disengaged upon release of the "opening" blade for movement to its uncovering position, thereby initiating an exposure interval. Thereafter, when the electromagnet 78 is de-energized, the bias of spring 60 overpowers the bias of the weaker spring 74 to cause the detent 66 to cam the lever 70 in a clockwise direction, thereby releasing the "closed" blade for movement to a covering position with respect to the exposure aperture and terminate the exposure interval.

For actuation of the shutter mechanism 16 to effect an exposure, it is provided with a shutter actuation button 80 mounted in an external position on the camera so as to be available to a camera operator. The button 80 is mechanically coupled to a rod or bar 82 that is slidably mounted on mounts (not shown) for movement toward engagement with a detent 84 on shutter latch lever 50, when the shutter actuation button 80 is depressed. Initial movement of the slide bar 82 causes a projection 86 thereon to engage a contact of a normally open switch S1, thereby causing the switch to be closed. An actuating member 87 on a slide bar 82 then engages simultaneously movable contacts of a pair of switches S2 and S3, thereby opening the normally closed switch S2 and moving the flexible spring contacts a against its bias out of engagement with fixed contact b and into engagement with contact c of the switch S3. Continued movement of the slide bar 82 causes it to engage the detent 84 and rotate the latch 50 in a clockwise direction out of engagement with the detent 53 on the " opening" shutter blade 44, thereby releasing the blade for movement under the influence of spring 48 to an uncovering position with respect to the exposure aperture 24 to thereby initiate an exposure interval. When the "opening" blade 44 moves away from its cocked position, it moves out of engagement with one of the contacts of a normally closed switch S4, thereby causing that switch to open.

As shown in FIG. 1 the shutter mechanism is in its cocked position preparatory to actuation of the shutter blade to effect exposure by the operator. When the camera operator depresses the shutter actuation button 80, switch S1 closes energizing the exposure control circuit shown in FIG. 2, switches S2 and S3 are then actuated, and then latch 50 is rotated clockwise to release the "opening" blade for movement to its uncovering position with respect to the exposure aperture to thereby initiate an exposure interval and open timing switch S2. When shutter blade 44 moves to its uncovering position, the detent 56 moves out of engagement with the detent 58 on the closing shutter blade 46. However, the electromagnet 78 is energized by the exposure control circuit when the switch S1 is closed, as described below, and latch 70 is held in its retaining position by the electromagnet to prevent the "closing" blade 46 from moving away from its unblocking position. After a period of time determined by the circuit in response to the level of illumination detected by a photoresponsive member in the circuit, the electromagnet 78 is de-energized to release the "closing" blade 46 for movement to its blocking position to terminate the exposure interval. Following an exposure the shutter blades can be returned to their cocked positions by movement of a cocking lever 62 to engage a detent 64 thereon with the detent 56 on the "opening" blade to move the blades back to their cocked position, shown in FIG. 1.

As described above when the shutter actuation button 80 is depressed, switch S1 is closed prior to actuation of switches S2 and S3 and prior to the release of the "opening" blade. Closure of the switch S1 energizes the circuit, shown in FIG. 2, from a battery source 90. Because of the particular bias voltages established as a result of the closing of the switch S1, a first trigger circuit, indicated as block 92 having an output terminal 93, is energized into a conductive state almost instantaneously. When the trigger circuit 92 is in a conductive state, it causes a current through a coil 94 of the electromagnet 78 to retain the "closing" shutter blade 46 in its initial uncovering position after the "opening" blade 44 has moved away from its initial position.

Closure of switch S1 also activates the diaphragm control network through the closed switch S2 and the engaged contacts a and b of switch S3. In the position shown switch S3 connects the photoconductive cell 30 in series with a variable resistance 96, which are connected through switch S1 across the battery source 90 to form a voltage divider circuit that provides a voltage at a junction 98 that is functionally related to the level of illumination incident on the photo-resistor 30. Connected to the junction 98 is the input terminal 38 of an aperture control circuit, shown as block 100, which is energized when switch S1 is closed to actuate oppositely poled drive coils 102 and 104 of servomotor 36 according to the input voltage. The aperture control circuit can be a differential amplifier, such as disclosed in commonly assigned, copending U.S. Pat. application, Ser. Nos. 823,426 or 823,789, filed in the names of Daniel E. Carter et al. on May 9, 1969 and May 12, 1969, respectively. Other examples of control circuits that can be used to control the aperture according to this invention are disclosed in U.S. Pat. No. 3,427,941 issued to L. M. Metzger on Feb. 18, 1969. When switch S1 is closed, the armature 35 of the servomotor 36 is rotated by the drive coils 102 and 104 to adjust the diaphragm blades 18 and 20 in respectively opposite directions to increase or decrease the exposure aperture to a size suitable for the level of illumination incident on the photoresistor 30.

Also connected to the junction 98 is an input terminal 106 of a second trigger circuit, indicated as a block 108, for controlling an indicator circuit. The output terminal 110 of the trigger circuit 108 is connected in series with an indicator lamp 112. The trigger circuit 108 is adapted to be switched between a conductive state when the voltage at the junction 98 is below a predetermined value, and a nonconductive state when that voltage is above that predetermined value. Thus, the lamp 112 is energizable through the trigger circuit 108 to indicate low scene light conditions.

Further depression of shutter actuation button 80 causes the member 87 to open the switch S2 and actuate the switch S3 to engage the contact a with contact c, thereby disconnecting the aperture control circuit and the indicator control trigger circuit 108 from the battery source 90, and connecting the photoresistor 30 in series with a capacitor 120 to operate as an integrating circuit. The trigger circuit 92 has an input terminal 122 connected to the junction 124 between the photoresistor 30 and the capacitor 120 which is grounded through a switch S4 so that the voltage at the input terminal 122 of the trigger circuit 92 is maintained at ground potential when switch S2 is closed. However, when the "opening" blade 44 is released from its cocked position, the normally closed switch S4 is opened, as explained above, to cause the capacitor 120 to be charged through the photoresistor 30 at a rate determined by the resistance value of the photoresistor. The photocell 30 is disposed to receive light from a scene being photographed, so that its resistance value is functionally related to the level of scene brightness. Thus, when switch S4 opens, the voltage at 124 changes from its initial ground potential to a predetermined value in a period of time depending on the well-known time constant RC of the integrating circuit, which is determined by the value of the capacitor 120 and the value of resistance 30 as established by the intensity of the light from the scene to be photographed. When the voltage at the input terminal 122 of trigger circuit 92 reaches the predetermined value, the trigger circuit is caused to trigger or switch from its conductive state to its non-conductive state thereby causing the electromagnet 78 to rapidly reduce its attracted force on the keeper 76 so as to release the blade 46 permitting it to move to its blocking position under the biasing force of spring 60. Thus the exposure interval is initiated simultaneously with the activation of the integrating circuit by the opening of switch S4, and it is terminated in response to triggering of the trigger circuit 92 after a period of time determined by the integrating circuit according to the illumination incident on the photoresistance 30. Therefore, the time between the release of the blade 44 and the release of blade 46 is dependent upon the value of the resistant 30 in the integrating circuit, which is determined by the level of scene illumination incident thereon. Thus, a highlight level under very bright conditions produces a low resistance value of resistance 30 and has a small RC time constant for the circuit which results in a short exposure time. Similarly a low level of scene brightness produces a high resistance value and has a longer time constant for the circuit which results in a long exposure time under dim light conditions.

Also connected to the output terminal 93 of the trigger circuit 92 is the base of an NPN transistor T which has its collector-emitter path connected in series with the indicator lamp 112. When the switch S1 is closed and the trigger circuit 92 is energized to a conductive state, the transistor T is biased to a nonconductive state so that the energization of the lamp 112 is controlled only by the circuit 108 and functions as a low light indicator. When the trigger circuit 108 is disconnected from the battery source 90 by the switches S2 and S3, the lamp 112 becomes inactive until the shutter control trigger circuit 92 is de-activated to a non-conductive state at the termination of an exposure interval, at which time the transistor T is biased conductive to turn the lamp on. Thus, the lamp 112 is off during the exposure interval, and it is turned on when the exposure interval is terminated. Accordingly, the transistor T functions as an "or" gate, so that the lamp 112 is controlled by either trigger circuit 92 or 108. This arrangement enables the lamp 112 to provide a low light signal, as well as a "shutter-closed" signal.

Several types of well-known trigger circuits are suitable for use as the trigger circuits 92 and 108. A Schmidt trigger is one example of such a typical prior art circuit. Further description of the details of the trigger circuits 92 and 108 is considered unnecessary, since their structure and switching function are well known in the prior art.

When an exposure is to be made with a photoflash apparatus, a switch S5 is closed to connect a fixed resistor 126 in parallel with the photoresistor 30. The fixed resistance 126 has a much lower resistance value than the photoresistor 30 in low light conditions, so that the timing capacitor 120 is charged principally through the resistance 126 to provide a predetermined shutter speed for flash operation. Preferably the switch S5 is actuated to close automatically in response to insertion of a photoflash apparatus on the camera. Thus, when the switch S5 is closed, the aperture is set to a nominal position by the aperture control circuit because of the fixed resistance thereby placed in the circuit in parallel with the photocell. When focusing changes are required in a camera, it's possible to compensate for the focusing adjustment in the aperture setting, for example, by mechanically coupling the variable resistor 96 to the focus drive.

The invention has been described in detail with particular reference to preferred embodiments thereof, but it will be understood that variations and modifications can be effected within the spirit and scope of the invention.

We claim:

1. In a camera adapted to expose film to scene light, an exposure control apparatus comprising:
   a. photoresponsive means adapted to receive illumination from an object scene for providing an electrical signal that varies as a function of the level of illumination incident thereon;
   b. first electronic circuit means including said photoresponsive means, and adapted to switch between a first state when the scene illumination exceeds a predetermined level, and a second state when the scene illumination is below said predetermined value;
   c. second electronic circuit means including said photoresponsive means, said second circuit means being activatable and adapted to switch from a first state to a second state a period of time after activation thereof, the time period being established as a function of the level of scene illumination;
   d. shutter means for covering and uncovering the exposure aperture;
   e. means for actuating said shutter means to uncover said exposure aperture to initiate an exposure interval;
   f. means for activating said second circuit means substantially in synchronization with the actuation of said shutter means to uncover said exposure aperture;
   g. means for actuating said shutter means to cover said exposure aperture in response to switching of said second circuit from said first state to said second state to terminate the exposure interval, so that the exposure interval is determined by said second circuit means as a function of the level of scene illumination; and
   h. an indicator circuit including signal means, said indicator circuit being connected to said first and second electronic circuit means, and adapted to activate said signal means when either of said circuits is in its respective second state to provide a signal prior to an exposure interval when the scene illumination is below a predetermined value, and to provide a signal when an exposure interval is terminated.

2. In a camera adapted to expose film to scene light, an exposure control apparatus comprising:
   a. photoresponsive means adapted to receive illumination from an object scene for providing an electrical signal functionally related to the level of scene illumination incident thereon;
   b. diaphragm means for establishing an exposure aperture, said diaphragm means including a member movable to any position along a path to vary the size of the exposure aperture, and a magnetic member associated with said diaphragm member for movement therewith;
   c. a diaphragm control circuit including said photoresponsive means, and including drive coil means having oppositely poled inputs, said coil means being associated with said magnetic member for moving said diaphragm member in a first direction along said path in response to energization of one of said drive coil inputs and for moving said diaphragm member in the respectively opposite direction along said path in response to energization of the other drive coil input, said circuit being activatable to selectively energize said coil means to adjust the exposure aperture to a size suitable for the level of illumination incident on said photoresponsive means;
   d. means for activating said diaphragm control circuit to adjust the exposure aperture;
   e. actuatable shutter means for covering and uncovering said exposure aperture;
   f. a first trigger circuit including said photoresponsive means, said circuit being activatable and adapted to switch from a first state to a second state a period of time after activation of said trigger circuit, the time period being established as a function of the position of the diaphragm member and the second electrical signal from said photoresponsive means;
   g. means for actuating said shutter means to uncover said exposure aperture to initiate an exposure interval after activation of said diaphragm control circuit;
   h. means for activating said first trigger circuit in synchronization with the actuation of said shutter means to uncover said exposure aperture;
   i. means for actuating said shutter means to cover said aperture in response to switching of said first trigger circuit to its second state to terminate the exposure interval, so that the exposure interval is determined by said first trigger circuit as a function of the level of scene illumination and the size of the exposure aperture;
   j. a second trigger circuit including said photoresponsive means, said second trigger circuit being adapted to switch between a first state when said electrical signal exceeds a predetermined value, and a second state when said electrical signal is below said predetermined value; and
   k. an indicator circuit including signal means, said indicator circuit being connected to said first and second trigger circuits, and adapted to activate said signal means when either of said trigger circuits is in its respective second state to provide a signal prior to an exposure interval when scene illumination is below a predetermined value, and to provide a signal at the termination of the exposure interval to indicate the length of the exposure interval.

* * * * *